(No Model.)
W. H. VAN SCHAICK.
CORN HUSKING MACHINE.
No. 584,973. Patented June 22, 1897.
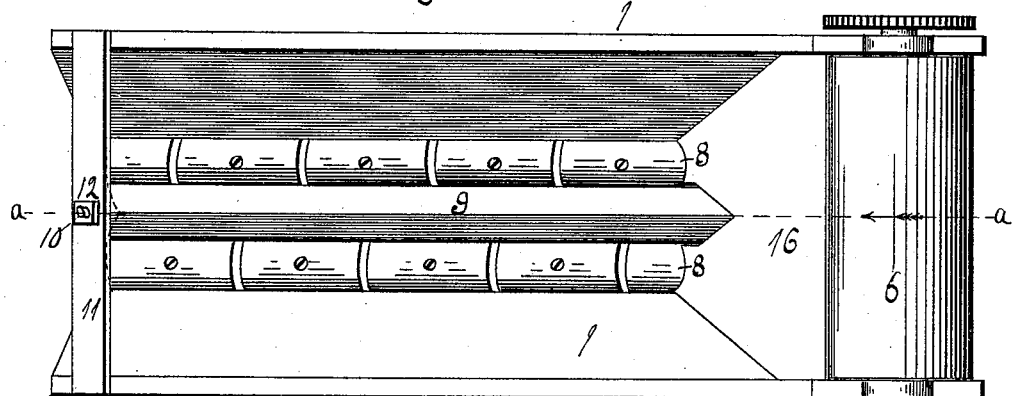
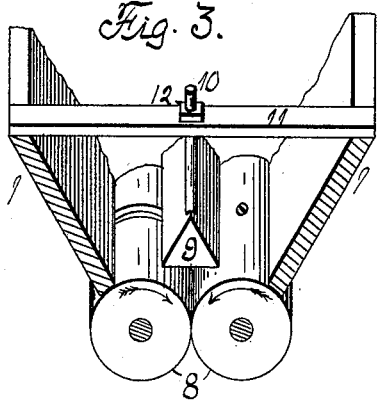
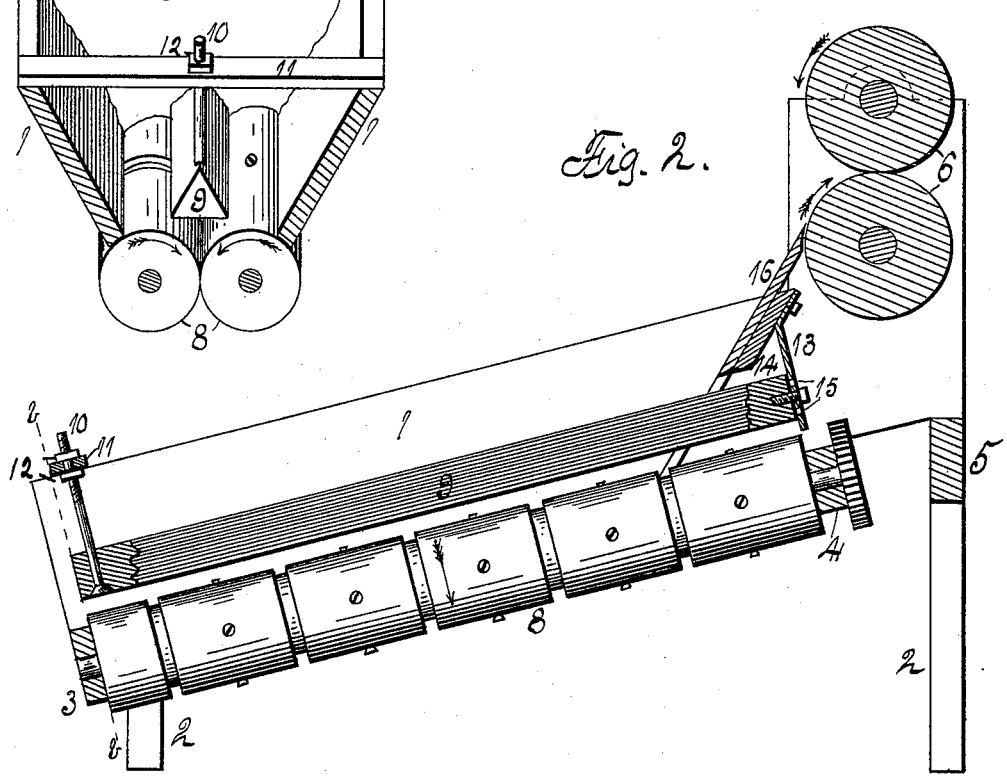
Witnesses:
E. Behel.
H. R. Lillibridge.
Inventor:
William H. Van Schaick
By A. O. Behel
Atty.
THE NORRIS PETERS CO., PHOTO-LITHO., WASHINGTON, D. C.

UNITED STATES PATENT OFFICE.

WILLIAM H. VAN SCHAICK, OF WALWORTH, WISCONSIN.

CORN-HUSKING MACHINE.

SPECIFICATION forming part of Letters Patent No. 584,973, dated June 22, 1897.

Application filed January 16, 1897. Serial No. 619,436. (No model.)

*To all whom it may concern:*

Be it known that I, WILLIAM H. VAN SCHAICK, a citizen of the United States, residing at Walworth, in the county of Walworth and State of Wisconsin, have invented certain new and useful Improvements in Corn-Husking Machines, of which the following is a specification.

The object of this invention is to prevent the ears of corn from feeding to the husking-rolls faster than they can be husked, thereby preventing clogging of the machine.

In the accompanying drawings, Figure 1 is a plan view of a corn-husking machine embodying my invention. Fig. 2 is a vertical lengthwise central section on dotted line *a*, Fig. 1. Fig. 3 is a transverse section on dotted line *b*, Fig. 2.

The corn-husking machine shown in the drawings in the main is of an old construction to which I have applied my improvements.

The main frame consists of the sides 1, supported upon standards 2, connected by cross-bars 3, 4, and 5. Rolls 6 for snapping the ears from the cornstalks are supported by the section of the framework and are geared together and driven by a belt connection with the pulley 7. Below the sides 1 are located two husking-rolls 8, geared together, one of which is driven in any suitable manner which imparts a rotary motion to the other. These rolls are located in an inclined plane, their upper ends being beneath the snapping-rolls 6 and supported in suitable bearings with cross-bars 3 and 4. Thus far described the husker is of an old construction.

My improvements consist of a bar 9, placed over the center between the husking-rolls and some distance above them, and is held supported at its lower end by a rod 10, passing through the bar and through a cross-bar 11, supported by the sides of the frame receiving nuts 12 on each side of the bar. The upper end of this bar 9 is supported by a depending bracket 13, secured to a cross-bar 14, the lower end of the bracket provided with a series of holes 15 and a screw passing through one of the holes into the end of the bar. This bar is preferably of triangular form, having one edge uppermost and extending the length of the husking-rolls. A shield 16 is secured to the cross-bar and has its lower end fitted to the upper face of the husking-rolls.

The bar 9 is adjusted vertically until the space between its lower face and the top face of the husking-rolls is sufficient to permit the passage of an ear of corn when lying down.

The cornstalks are fed in between the rolls 6 and the ears of corn are snapped off, the stalks passing through the rolls. The ears drop upon the shield 16 and fall upon the husking-rolls between the sides of the frame and bar 9. The rotation of the husking-rolls will cause its projections to catch the husks of the ears of corn and draw them under the bar until they are between the rolls, at which point the husks are removed and the ears of corn allowed to pass down the rolls and be discharged at the lower ends of the rolls. By this arrangement of the bar 9 the ears of corn are prevented from clogging the husking-rolls, as the ears under the bar must be husked and pass down the rolls before new ears can pass under the bar.

I claim as my invention—

In a corn-husking machine, the combination of a pair of husking-rolls and a bar located above and between the rolls in order that the ears of corn must be fed to the rolls each side of the bar.

WILLIAM H. VAN SCHAICK.

Witnesses:
M. E. HITCHCOCK,
V. B. SEVERANCE.